UNITED STATES PATENT OFFICE.

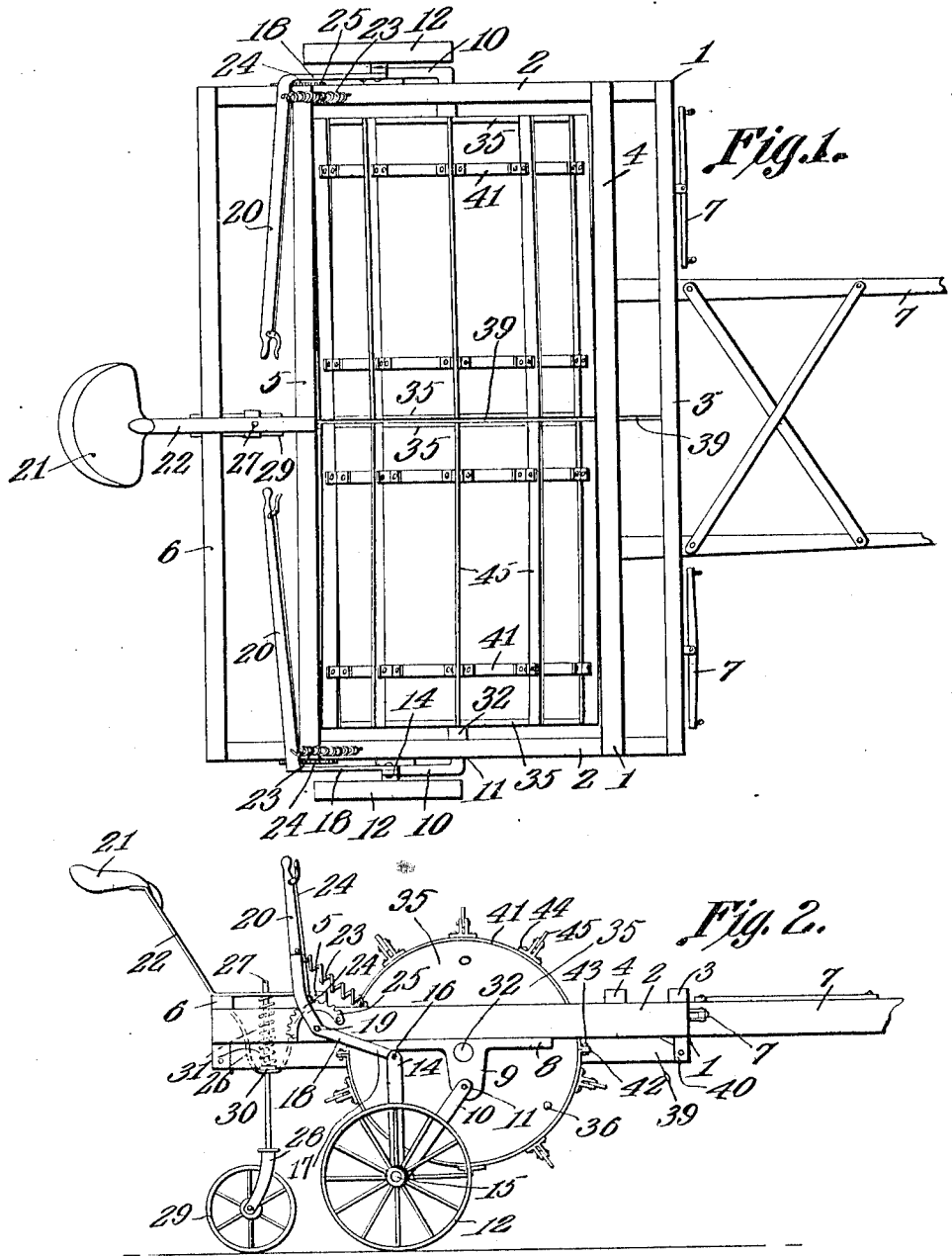

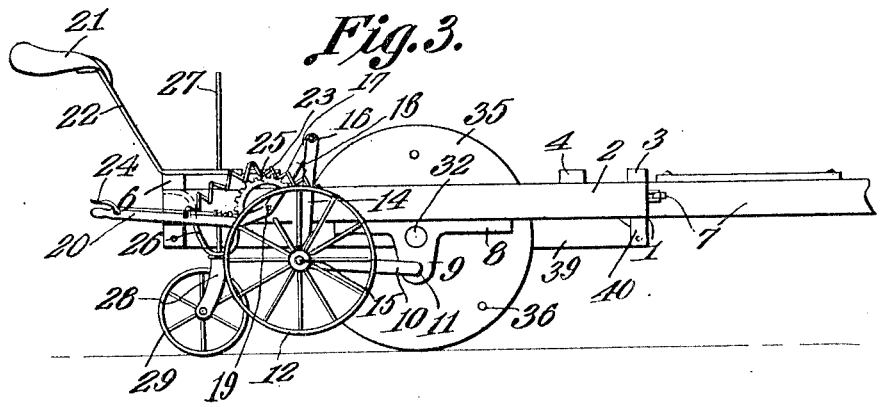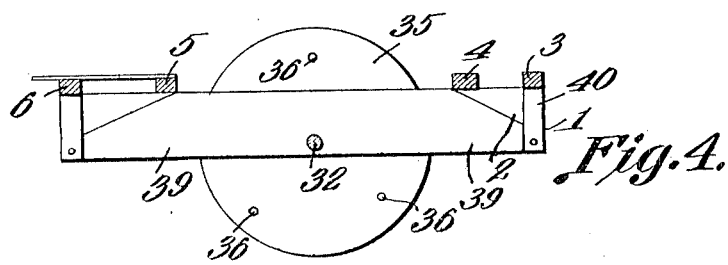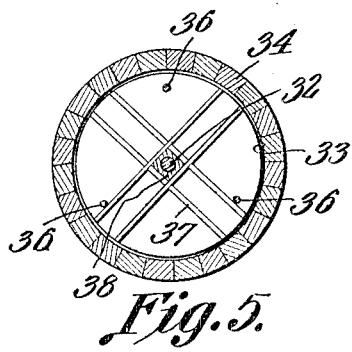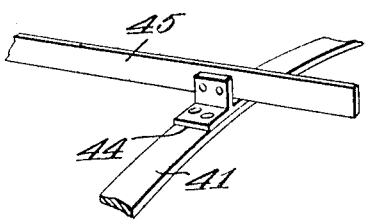

JULIUS J. NOHR, OF CROFTON, NEBRASKA.

COMBINED STALK-CUTTER AND ROLLER.

1,089,948.  Specification of Letters Patent.  Patented Mar. 10, 1914.

Application filed February 28, 1913. Serial No. 751,353.

*To all whom it may concern:*

Be it known that I, JULIUS J. NOHR, a citizen of the United States, residing at Crofton, in the county of Knox and State of Nebraska, have invented a new and useful Combined Stalk-Cutter and Roller, of which the following is a specification.

One object of the present invention is to provide novel mechanism whereby the supporting wheel of a combined stalk cutter and roller may be manipulated from the driver's seat.

Another object of the invention is to provide novel means for supporting the roller carrying frame when the same is elevated to bring the rollers out of engagement with the ground.

A further object of the invention is to provide a novel means for assembling the cutting blades with the roller.

It is within the scope of the invention to improve generally and to increase the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawings:—Figure 1 is a top plan; Fig. 2 is a side elevation, showing the frame of the machine elevated, to bring the combined roller and stalk cutter out of engagement with the ground; Fig. 3 is a side elevation showing the frame depressed, so that the roller and stalk cutter is engaged with the ground; Fig. 4 is a fragmental transverse section of the frame; Fig. 5 is a transverse section of the roller; and Fig. 6 is a perspective detail showing a portion of the mechanism whereby the stalk cutting blades are assembled with the roller.

In carrying out the invention there is provided a frame 1, comprising side bars 2 connected at their forward ends by front cross bars 3 and 4, and connected adjacent their rear ends by rear cross bars 5 and 6. Suitable draft rigging of any desired form, indicated by the numeral 7, is connected with the forward portion of the frame 1.

Secured to the side bars 2 of the frame 1 are bearings 8 provided intermediate their ends with depending lugs 3. Cranks 10 are provided, the forward ends of the cranks 10 being journaled in the depending lugs 9 of the bearings 8, as shown at 11. Ground wheels 12 are journaled for rotation upon the rear, lower ends of the cranks 10. Links 14 are pivotally connected as indicated at 15 with the cranks 10 adjacent their lower ends, the rear upper ends of the links 14 being pivotally connected as indicated at 16 with the forwardly and upwardly projecting angularly disposed ends 17 of levers 18, the levers 18 being fulcrumed as indicated at 19 upon the side bars 2 of the frame 1.

The levers 18 include handles 20 which extend transversely of the frame 1, the handles 20 being upwardly inclined, and their inner ends being disposed in close relation with a seat 21 carried by a support 22, the forward end of the support 22 being secured to the rear cross bars 5 and 6. A retractile spring 23 is connected with each of the handles 20 of the levers, the forward ends of the springs 23 being secured to the side bars 2 of the frame 1. Each lever 18 carries suitable latch mechanism 24, adapted to coöperate with a segment 25 which is secured to the side bars 2 of the frame.

Connected with the rear cross bars 5—6 is a depending bracket 26 in which a standard 27 is mounted to slide longitudinally and to rotate, the upper end of the standard being slidable and rotatably received in the forwardly extended portion of the support 22 between the rear cross bars 5 and 6. Journaled upon the lower end of the standard 27 is a boss 28 carrying an auxiliary wheel 29. Above the bracket 26, the standard 27 is equipped with an abutment 30, receiving the lower end of a spring 31, the upper end of which abuts against the forwardly extended portion of the support 22.

Journaled for rotation in the bearings 8, directly above the forward ends of the cranks 10 is a shaft 32 upon which is mounted to rotate, independently, a pair of ground engaging rollers. The rollers are of identical construction, and but one of them will be described, and in this connection it may be stated that the rollers may be variously formed, without jeopardizing the utility of the invention. In the present instance, although not necessarily, each roller comprises a pair of internal, terminal rims 33, supporting a plurality of longitudinally extended segments 34, the segments being secured to the rims 33 in any desired manner. Each roller comprises rigid end plates 35 which may be held in place by means of longitudinally extended tie rods 36. Each roller includes a plurality of parallel, intersecting spokes 37, connected with the rim 33, the spokes 37 at their point of intersection supporting a bearing 38, the shaft 32 being of circular form, so as to rotate in the bearings 38.

Located between the rollers is a division plate 39, seen most clearly in Fig. 4, the division plate 39 preferably being held on the cross bars 3 through the medium of brackets 40, although the division plate 39 may be assembled with the frame of the machine in any other suitable manner.

Around the ends of the rollers and inclosing the segments 34, extend bands 41, the bands 41 preferably being fashioned in two parts, the parts of the bands being equipped with outstanding ears 42, connected by securing elements 43. The parts of the bands 41 support cutting blades 45 which preferably lie at a small angle with respect to the axis of the roller. If desired, angle brackets 44 may be riveted to the parts of the bands 41, the angle brackets 44 being rigidly secured to the blades 45. The angle brackets 44 are disposed in pairs and the blades 45 lie between the members of each pair.

As will be understood readily, presupposing that the parts are positioned as shown in Fig. 2, the handles 20 of the levers 18 may be drawn rearwardly, without necessitating the operator leaving the seat 21. Under the circumstances above pointed out, the ends 17 of the levers will be elevated, the links 14 drawing upwardly upon the cranks 10 and effecting a depression of the frame 1, so that the rollers are brought into contact with the ground, as clearly shown in Fig. 3. During that operation which consists in moving the parts from the positions shown in Fig. 3, to the positions shown in Fig. 2, the springs 23 which, in Fig. 3 are under tension, will aid in the restoration of the parts to their original positions.

When the rollers are lowered into contact with the ground, as shown in Fig. 3, the standard 27 will slide in the bracket 26 and in the forwardly extended portion of the seat support 22, the spring 31 being put under compression. When the roller is in contact with the ground, as shown in Fig. 3, the compressed spring 31 will aid in supporting the rear portion of the frame 1, without interfering with the engagement between the rollers and the ground.

Since the handles 20 of the levers 18 extend across the top of the frame, and since these handles 20 are to be manipulated from the driver's seat 21, the play given to the handles 20 will be somewhat limited.

It will be understood readily that when the structure is to be used as a roller, as distinguished from a stalk cutter, the blades 45 may be detached by removing the securing elements 43 out of the ears 42 of the parts of the bands 41. Under such circumstances, the stalk cutting mechanism will come away from each roller in two parts, each part comprising a pair of approximately semi-circular bands connected by a plurality of transverse blades. The operation of removing the stalk cutting mechanism from the roller, therefore, may be effected rapidly, simply by removing from each roller, the securing elements 43 which unite the ends of the part of the bands 41.

The division plate 39 serves to support the intermediate portion of the shaft 32 for rotation, it serves as a brace for the frame, and serves to separate the roller.

Owing to the fact that the rollers are individually journaled for rotation upon the shaft 32, it will be obvious that one roller will continue to rotate, should the rotation of the other roller be impeded by engagement with a stump or like object.

It is to be noted that the forward ends of the cranks 10 are pivotally connected with the lugs 9 directly below the shaft 32. As a consequence, the operation of raising and lowering the frame is facilitated.

Having thus described the invention, what is claimed is:—

1. In a device of the class described, a vertically movable frame; a soil engaging member fixed on the frame for vertical movement with the frame; a caster wheel vertically movable on the frame independently of the frame and located to the rear of the soil engaging member; resilient means for limiting the upward movement of the caster wheel; soil engaging supporting means vertically movable upon the frame independently of the frame and located between the soil engaging member and the caster wheel; and mechanism for raising and lowering the supporting means.

2. In a device of the class described, a vertically movable frame; a soil engaging member fixed on the frame for vertical movement with the frame; a standard mounted in the frame for rotation and for vertical sliding movement; a spring surrounding the standard and engaging the frame to limit the upward movement of the standard; a ground wheel journaled on the lower end of the standard; soil engaging supporting means vertically movable upon the frame independently of the frame and located between the ground wheel and the soil engaging member; and mechanism for raising and lowering the supporting means.

3. In a device of the class described, a frame including cross bars; a seat; a support upholding the seat and connected with the cross bars; a bracket secured to the cross bars; a standard mounted to slide in the bracket and in the support; a spring surrounding the standard and abutting at one end against the support; a fixed abutment on the standard, located above the bracket and receiving the other end of the spring; a caster wheel supported by the standard; a soil engaging member carried by the frame; and means for raising and lowering the frame, independently of the caster wheel and the soil engaging member.

In testimony that I claim the foregoing as my own, I have hereto affixed my signature in the presence of two witnesses.

JULIUS J. NOHR.

Witnesses:
 OTTO BOGNER,
 CONRAD KUEHLER.

Copies of this patent may be obtained for five cents each, by addressing the "Commissioner of Patents, Washington, D. C."